Aug. 29, 1961  P. J. FLYNN  2,997,977
MOTOR VEHICLE BACK-UP SIGNAL DEVICE
Filed Aug. 26, 1960

INVENTOR.
PAUL J. FLYNN,
BY
McMorrow, Berman & Davidson
ATTORNEYS.

United States Patent Office 2,997,977
Patented Aug. 29, 1961

2,997,977
MOTOR VEHICLE BACK-UP SIGNAL DEVICE
Paul J. Flynn, 32 W. Rogers Blvd., Duluth 6, Minn.
Filed Aug. 26, 1960, Ser. No. 52,219
1 Claim. (Cl. 116—60)

This invention relates to signal devices for motor vehicles, and more particularly to a device for providing an audible signal when a motor vehicle is parking or backing up, whereby to warn persons near the vehicle of its movement.

A main object of the invention is to provide a novel and improved signal device for use on a motor vehicle to warn nearby persons that the vehicle is backing up or is moving in the vicinity of such persons, the device being simple in construction, being easy to install, and being relatively compact in size.

A further object of the invention is to provide an improved signal device for motor vehicles to warn persons in the vicinity of a vehicle that said vehicle is backing up or is otherwise moving in the immediate vicinity of the person, the device being inexpensive to manufacture, being neat in appearance, being durable in construction, and providing a reliable audible indication of rotation of a vehicle wheel on which it is mounted.

Further objects and advantages of the invention will become apparent from the following description and claim, and from the accompanying drawings, wherein:

Figure 1:
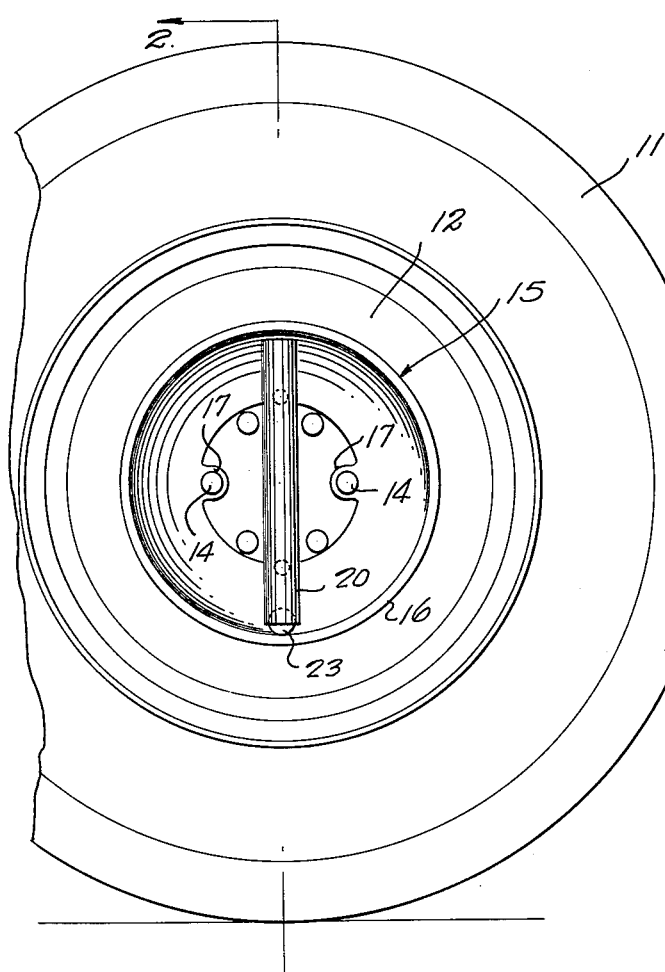
FIGURE 1 is a fragmentary side elevational view of a vehicle wheel provided with an improved signal device constructed in accordance with the present invention.

Referring to the drawings, 11 designates a motor vehicle wheel, for example, one of the rear wheels of a motor vehicle such as a truck, or the like. The wheel 11 is of conventional construction and includes a generally annular body portion 12 which is secured to a vehicle axle hub element 13 by the conventional fastening bolts 14, as is clearly shown in FIGURE 2.

Figure 2:
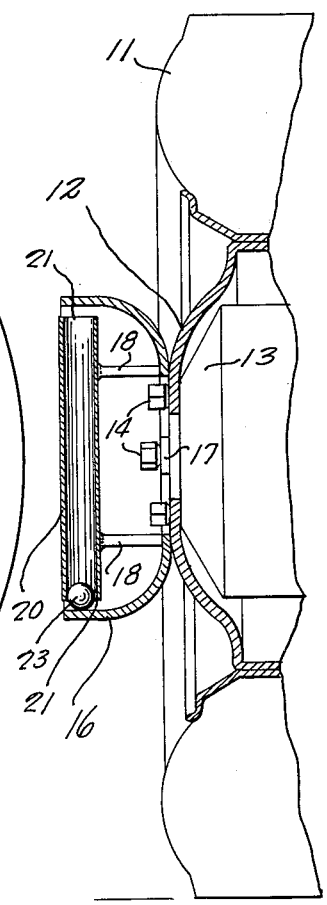
FIGURE 2 is a vertical cross sectional view taken substantially on the line 2—2 of FIGURE 1.
Figure 3:
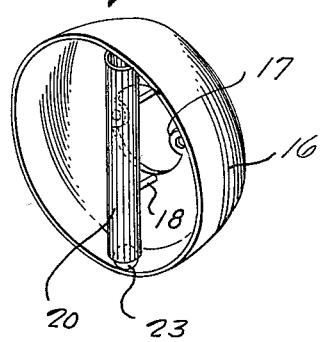
FIGURE 3 is a perspective view on a reduced scale of the signal device employed on the wheel of FIGURES 1 and 2.

Designated at 15 is a signal device which is adapted to be secured to the central portion of the vehicle wheel 11 for providing an audible warning when the wheel is rotating at a relatively slow speed, for example, when the vehicle is backing up or is otherwise being maneuvered. The signal device 15 comprises a generally annular bell-shaped body 16 of suitable metal and of a thickness such that the body is easily set into vibration to provide a relatively loud sound. The bell-shaped body 16 is outwardly concave, as shown in FIGURE 2, and is formed at its innermarginal portion 16' with a pair of inwardly projecting apertured lugs 17, 17 which are located to register with a pair of diametrically opposed fastening lugs 14 employed to secure the vehicle wheel to the brake drum 13. Thus, the apertured lugs 17 register with the bolt apertures of the wheel body member 12 and the bolts 14 are employed to fasten the body 16 coaxially to the wheel by means of the diametrically opposed bolts 14, 14 illustrated in FIGURE 1.

The body 16 is formed with a pair of parallel, diametrically opposed supporting pins 18, 18 which are rigidly secured in the marginal portion 16' of the body 16 on a diameter substantially perpendicular to the diameter on which the lugs 17, 17 are located. The pins 18, 18 extend parallel to the axis of the body 16 and extend into and are rigidly secured to a diametrically extending tubular supporting member 20 which is disposed within the body 16 substantially at its outer portion 21', as shown in FIGURE 2. Thus, the major portion of the tubular supporting member 20 is received in the body 16 and is located within the outer marginal portion 21' of said body 16. The tubular member 20 terminates just short of the diametrically opposed portions of the outer margin 21' of the body 16, so that the opposite ends 21, 21 of said tubular member are spaced inwardly by relatively short distances from the annular wall of said body 16.

Designated at 23 is a steel ball which is movably disposed in the supporting tube 20, said ball being of substantial weight so that it is engageable with the wall of the bell-shaped body 16 to vibrate same responsive to rotation of said bell-shaped body when the vehicle is rotating at a relatively slow speed, for example, when the vehicle is parking or is backing up.

When the vehicle wheel rotates at a relatively high speed, such as in normal travel of the vehicle, the ball 23 is held in an outermost position by centrifugal force and does not vibrate the bell-shaped body 16. However, when the vehicle is moving at slow speed, the ball 23 reciprocates in the tubular supporting member 20 and repeatedly strikes the bell-shaped body 16 so as to vibrate same.

As shown in FIGURE 2, the clearance space between the ends 21 of the tubular supporting member 20 and the wall of the bell-shaped body 16 is too small to allow the ball to escape therefrom but is sufficient to prevent any contact between the annular wall of the bell-shaped body and the tubular supporting member 20.

While a specific embodiment of an improved signal device for use on a motor vehicle wheel has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A signal device of the character described comprising an outwardly concave annular bell-shaped body of vibratory material, diametrically opposed inwardly projecting lugs on the inner marginal portion of said body having apertures registering with the bolt apertures of a vehicle wheel and being adapted to be secured to the central portion of the vehicle wheel by the fastening bolts thereof, a tubular support member, means rigidly securing said support member substantially diametrically in said bell-shaped body, and a sounding ball element loosely mounted in said support member and being engageable with portions of said bell-shaped body adjacent the opposite ends of said support member to vibrate the bell-shaped body responsive to rotation thereof, the opposite ends of said tubular support member being spaced from said portions of said bell-shaped body by distances smaller than the diameter of said sounding ball element.

References Cited in the file of this patent

UNITED STATES PATENTS 2,495,698     Chilson _____ Jan. 31, 1950